J. L. Whiting.
Brush.
No. 3,235. Reissued Dec. 15, 1868.
Fig; 1.
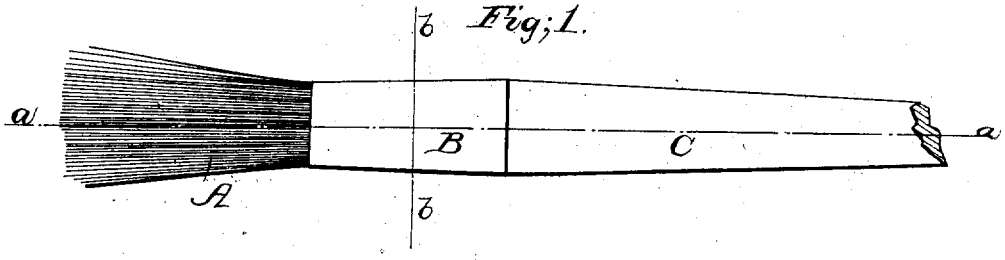
Fig; 2.
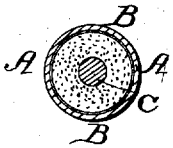
Fig; 3.
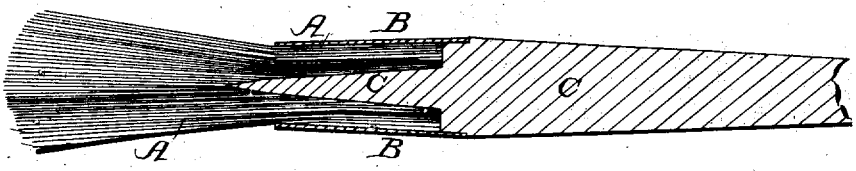
Witnesses;
S. P. Mayberry
Thomas B. Reed
Inventor;
John L. Whiting
H. PETERS, PHOTO-LITHOGRAPHER, WASHINGTON, D. C.

United States Patent Office.

JOHN L. WHITING, OF BOSTON, MASSACHUSETTS.

*Letters Patent No.* 39,439, *dated August* 4, 1863; *reissue No.* 3,235, *dated December* 15, 1868.

IMPROVED BRUSH

The Schedule referred to in these Letters Patent and making part of the same.

*To all persons to whom these presents may come:*

Be it known that I, JOHN L. WHITING, late of Portland, in the county of Cumberland, and State of Maine, but now of Boston, in the county of Suffolk, and State of Massachusetts, have invented a new and useful Improvement in the Method of Manufacturing Sash-Tools, Stencil-Brushes, Shaving-Brushes, and Artists' Brushes; and I do hereby declare the following to be a full and exact description thereof, reference being had to the accompanying drawings, making part of my specification.

Of such drawings—

Figure 1 is a side view,

Figure 2, a transverse section, and

Figure 3, a longitudinal section of a brush provided with my invention.

The nature or principle of my invention consists in the direct combination of a wedge or cone with the handle of a brush, so that the two may be in one piece, or the wedge or cone be formed on the handle, whereby the wedge or cone, when arranged within a mass of bristles, in manner as represented in the accompanying drawings, and encompassed by a ferrule, shall not only perform the function of distending such mass, so as to cause it to fit closely to the ferrule, but shall serve at the same time, and with cement, to securely hold the handle in connection with the mass. The arrangement of the wedge within the handle is such that the base of the wedge is connected to the handle, and is of a less size or diameter, relatively to the base of the handle, so that there may be a shoulder at the end of the handle, to encompass the base of the wedge, and serve as a support to the ends of the bristles, and also as an additional means of holding them in place through the aid of cement or pitch interposed between such shoulder and the adjacent ends of the bristles.

The use of pitch for fixing a wedge driven into a mass of bristles, when enclosed within a ferrule, is old, but in this case the wedge has been separate from or not formed on the handle, or has been a simple tapering ferrule driven into the mass of bristles, and designed to expand such mass into the ferrule, and hold and support a handle.

To enable a person skilled in the art of brush-making to make, construct, and use my improvement with reference to the brush-handle and wedge, I will now proceed to describe it more specifically, and also the method of applying it to a mass of bristles and a ferrule, so as to form a brush.

In the drawings—

A denotes the mass of bristles;

B, the ferrule,

C, the handle; and

C′ the wedge, point, or cone.

The shoulder is represented at D D in fig. 3.

The said parts C and C′ are in one piece of wood or material with the shoulder.

When having a shoulder as described, arranged and combined with the parts C C′, in manner as set forth, the part C, or handle-portion, will not only be connected in one piece with the wedge, but it will also be connected with the bristles, at their next adjacent ends, through the intervention of the cement.

The shoulder has advantages, particularly with reference to the handle and wedge, or cone, when formed in one piece of material, and arranged in manner as represented, for, under such circumstances, the shoulder, in case of shrinkage of the wedge or cone, will, by being cemented to the ends or buts of the bristles, serve to keep the bristles from being drawn or worked down in the ferrule while the brush is in use, the connection of the wedge or cone with the handle at the same time serving to keep the wedge in its proper place, and to cause the handle to be much better supported and less liable to work loose in the ferrule, while the brush may be in use, than would be the case were the handle and wedge, or cone, disconnected.

When the handle and cone are connected, and provided with the shoulder, the latter renders it practicable to use shorter stock, a shorter ferrule, and a shorter wedge, or cone, to the handle, in constructing a brush, than is the case when the handle and cone are disconnected. The brush is consequently rendered neater in appearance, of less weight, and therefore easier to be operated, or less tiresome to a party who may use it. Furthermore, the wedge, or cone, when connected with the handle, causes the bristles to give such support to the handle, while the brush may be in use, as to prevent the handle from working laterally in the ferrule so as to loosen or break the cement connecting the shoulder with the buts of the bristles.

When the handle and wedge, or cone, are connected, arranged, and provided with a shoulder, as described, a tapering ferrule arranged with them, in manner as represented, presents advantages which are not attained by a cylindrical ferrule. It holds the mass of bristles better in place, admits of more bristles being used in the mass, the handle to be made larger in diameter at its base, the bristles to be spread more by the wedge or cone while being driven into the mass, and, as a consequence, a better securing of the wedge or cone to the bristles, and of course the bristles to the handle, than would result were there no shoulder or were there one, and the wedge, or cone, and the handle were disconnected.

An important advantage possessed by my formation of the handle and wedge, or cone, in one piece of wood or material, and their arrangement together, as represented, is that such saves the employment and cost of any screw or separate means of uniting the two, which would be requisite were they in two pieces.

If the ferrule has a taper corresponding with that of the wedge, or cone, the bristles will be held to the ferrule by a uniform lateral pressure, limited by the strength of the ferrule, and the ability of the handle and the wedge, or cone, to resist compression. Besides, the taper of the ferrule enables the bristles to be spread at their buts, and within the ferrule, and about the wedge, or cone, so as to cause the cement to hold them to very much better advantage than they would be in a non-tapering ferrule.

The ferrule may be made of metal or other proper material; and to operate to best advantage, should be provided with a taper to correspond with or about with that of the wedge, or cone After having dipped to the necessary extent the upper or but-end of the mass of bristles in cement or pitch, I next insert the flag-end of the mass into the upper end, and through the ferrule, and draw the mass into place therein, so that the but-end shall be within the ferrule, and at a short distance from the upper end of it, or that end which is to abut against the handle. Having dipped the wedge, or cone, or the shoulder of the handle, in cement, pitch, or some proper resinous matter, the wedge, or cone, is next to be forced into the mass of bristles at its but, so as to spread the mass, and bring the shoulder down within the ferrule, and cement it to the buts of the bristles, which, by the shoulder and cement, will be thus covered and protected from water or liquid, which might otherwise get into the but of the mass when the brush is placed within water.

What I claim as my invention, is—

The wedge as forming a part of or being in connection with the handle, as set forth.

Also, the wedge and handle thus combined and constructed with the shoulder, the whole being substantially as specified.

JOHN L. WHITING.

Witnesses:

JOHN TIMMINS,

F. P. HALE, JR.